June 16, 1942.    D. M. LIGHT    2,286,861
SNUBBER
Filed March 23, 1940
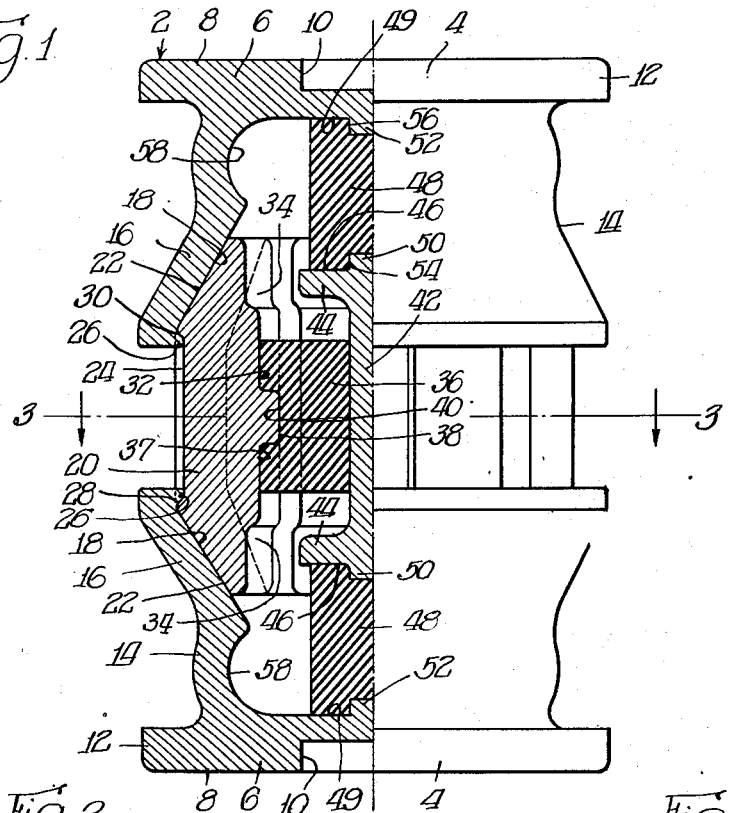
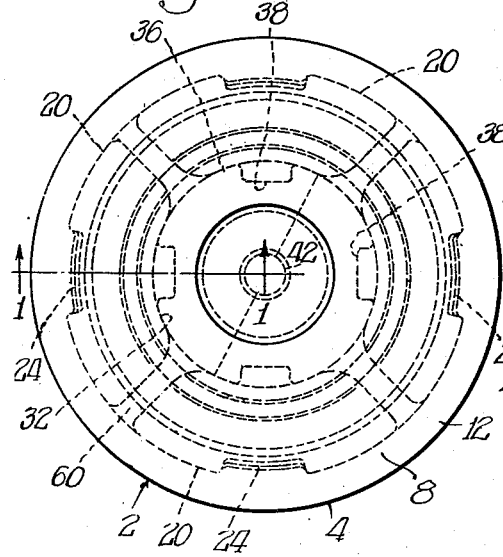
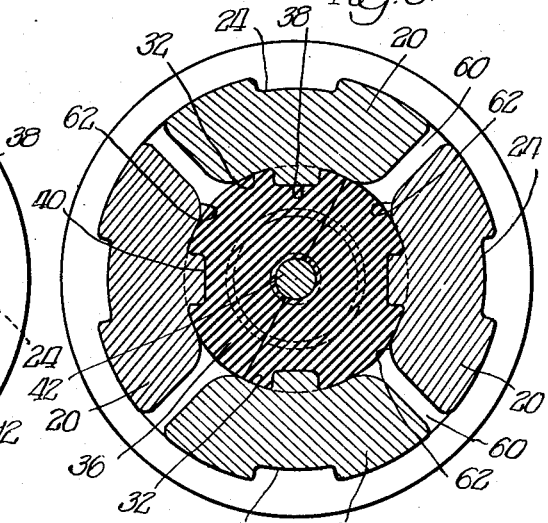
INVENTOR.
David M. Light,
BY
ATTORNEY.

Patented June 16, 1942

2,286,861

UNITED STATES PATENT OFFICE 2,286,861

SNUBBER

David M. Light, Chicago, Ill., assignor to American Steel Foundries, Chicago, Ill., a corporation of New Jersey Application March 23, 1940, Serial No. 325,542

30 Claims. (Cl. 267—9)

My invention relates to friction absorbing devices and more particularly to a device which is suitable for the replacement of a coil spring in a spring arrangement supporting a load carrying member.

An object of my invention is to design a modified form of the friction device shown in my co-pending application, Serial No. 245,946, filed December 15, 1938, and entitled Friction absorbing device. My present invention includes an improvement in the resilient member disclosed in said co-pending application and comprehends a composite resilient member comprising resilient pads vulcanized or secured in any convenient manner to a central rigid column in such manner that the composite member acts as a unit and facilitates assembly. My composite resilient member also contemplates a rigid member which may be embedded in and surrounded by resilient material.

Another object of my invention is to design such a device that will effectively reduce or eliminate harmonic vibrations when it is associated with coil springs or other undamped spring arrangements.

My invention comprehends more particularly a snubbing device wherein a plurality of friction shoes are urged into frictional engagement with end followers and comprises a central resilient member, a rigid member extending therethrough, and end resilient means interposed between said rigid member and said followers.

Another object of my invention is to provide release means of resilient material which will return said device to its normal position when the load is released.

My invention also contemplates such a friction absorbing device wherein interlocking means on the shoes and the followers maintain said device in assembled relationship.

Referring to the drawing, Figure 1 is a side elevation of a device embodying my invention, half in section, the section being taken substantially in the vertical plane bisecting said device as indicated by line 1—1 of Figure 2.

Figure 2 is a top plan view of the device shown in Figure 1, and Figure 3 is a sectional view of the device shown in Figure 1, the section being taken substantially in the horizontal plane indicated by line 3—3 of Figure 1.

Describing my invention in more detail, the device generally indicated at 2 comprises identical end followers 4, 4, each having a circular base 6 presenting a substantially flat outer face 8 interrupted centrally thereof by the recess 10 serving as positioning means for said device in well-known manner. An annular flange 12 may be formed around the outer circumference of said base. Integrally formed with said base may be the generally cylindrical housing or casing 14 having adjacent its open end outwardly flaring friction walls 16, 16 presenting internal tapering cylindrical friction surfaces 18, 18.

A plurality of segmental friction shoes 20, 20 extend between said housings and on their opposite ends have tapered arcuate friction faces 22, 22 engaging the complementary surfaces 18, 18. On the outer face of each shoe may be formed a vertical slot 24 receiving the spaced lugs 26, 26 on the outer edge of said surfaces 18, 18 for sliding engagement therewith. The engagement of said lugs with said slots maintains said shoes in their normal arrangement, and the abutment of said lugs with the end walls 28, 28 of said slots as at 30 retains said device in assembled relationship. The smooth arcuate inner faces 32, 32 of said shoes may be relieved at their opposite ends as at 34, 34 and have abutment against a cylindrical member 36 of suitable resilient material as at 37. Positioning means for said resilient member may be afforded by a lug 38 on each shoe engaging a complementary recess 40 in the outer circumference of said member 36.

The member 36 comprises two semi-cylindrical halves to facilitate assembly, and extending therethrough may be a rigid member or column 42 to which the resilient member may be secured in any convenient manner, such as vulcanizing. At opposite ends of said column 42 are formed annular flanges 44, 44 and secured thereto as at 46 in any convenient manner may be the cylindrical resilient pads 48, 48, said pads having abutment against the bases of said followers as at 49, 49. Positioning means for said pads 48, 48 are afforded by centrally formed lugs 50, 50 on opposite ends of said column and lugs 52, 52 centrally located on the inner surfaces of the base 6, said lugs being received respectively in recesses 54, 54 and 56, 56 on opposite ends of said pads 48, 48. It is apparent to those skilled in the art that the aforedescribed arrangement of the resilient pads 48, 48, the resilient member 36, and the column 42 form a composite resilient member, and it is contemplated that in such a composite member the rigid column may be embedded in and completely surrounded by suitable resilient material.

Between the outwardly flaring friction walls 16, 16 and the base 6, the smooth internal annular recess 58 affords space into which the resilient material of the pads 48, 48 may flow without abrasion when said device is compressed. It may also be noted that space is afforded between the flanges 44, 44 and the resilient member 36 so that the resilient material of said member 36 may flow therein during operation. Sufficient clearance between the shoes as at 60 permits radially inward movement thereof, and it may be noted that the inner vertical edges 62, 62 are formed with a relatively large radius so that a smooth surface is afforded along which the resilient material may flow without pinching and abrasion thereof as the shoes move inwardly.

When the device is placed under load, the end followers move toward each other compressing the pads 48, 48 between the column 42 and the bases of said followers and urge said shoes inwardly and compress the resilient member 36. As the load is released, the resilient pads 48, 48 urge the end followers apart into their normal released positions.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, opposed end followers having outwardly flaring housings presenting internal tapering friction surfaces adjacent their open ends, a floating rigid member, pads of resilient material interposed between the ends of said rigid member and said followers for spacing said followers apart, a resilient member surrounding said rigid member, a plurality of arcuate friction shoes urged into engagement with said tapering surfaces by said resilient member, and means on said followers and said shoes retaining said device in assembly.

2. In a friction absorbing device, end followers having friction walls presenting outwardly flaring internal friction surfaces adjacent their open ends, a plurality of arcuate friction shoes having wedge faces in complementary engagement with said surfaces, a composite resilient member abutting said shoes and said followers and comprising a floating column, a resilient member encircling said column, and resilient pads interposed between said column and said followers for yieldingly spacing apart said followers.

3. In a friction absorbing device, end followers having friction walls presenting outwardly flaring internal friction surfaces adjacent their open ends, a plurality of arcuate friction shoes having wedge faces in complementary engagement with said surfaces, and a composite resilient member comprising a column spaced from said shoes and said followers, and resilient pads compressed between said column and said shoes and said followers.

4. In a friction absorbing device, end followers having friction walls presenting outwardly flaring internal friction surfaces adjacent their open ends, a plurality of arcuate friction shoes having wedge faces in complementary engagement with said surfaces, a composite resilient member abutting said shoes and said followers and comprising a rigid member, a cylindrical resilient pad secured therearound, and resilient pads secured to opposite ends of said member.

5. In a friction absorbing device, end followers having outwardly flaring housings with internal friction faces, pairs of diametrically opposed arcuate shoes with faces engaging said faces, a rigid column centrally positioned between said followers and said shoes, a resilient member around said column and compressed between said shoes and said column, and other resilient members compressed between said column and said followers.

6. In a friction absorbing device, end followers having outwardly flaring housings with internal friction surfaces, arcuate shoes having tapering faces engaging said surfaces, a composite resilient member compressed between said shoes and said followers and comprising a central floating column, a plurality of resilient pads surrounding said column and vulcanized thereto, and an internal annular recess in said housings affording space for the flow of certain of said resilient pads when compressed.

7. In a friction absorbing device, opposed end followers having cylindrical housings presenting outwardly flaring internal friction surfaces, arcuate friction shoes having tapering faces engaging said surfaces, a resilient member compressed between said shoes, and release means comprising a column extending through said member, and resilient pads between said column and said followers.

8. In a friction absorbing device, end followers having friction walls presenting outwardly flaring internal friction surfaces adjacent their open ends, a plurality of arcuate friction shoes having wedge faces in complementary engagement with said surfaces, a centrally positioned column, a resilient pad therearound and compressed between said shoes, and other resilient pads compressed between said column and said followers.

9. In a friction absorbing device, end followers having friction walls presenting outwardly flaring internal friction surfaces adjacent their open ends, a plurality of arcuate friction shoes having wedge faces in complementary engagement with said surfaces, a composite resilient member abutting said shoes and said followers and comprising a floating column, and intermediate and end resilient pads secured thereto.

10. In a friction absorbing device, end followers having outwardly flaring housings with internal friction surfaces, arcuate shoes having tapered faces engaging said surfaces, a built-up resilient member compressed between said shoes and said followers and comprising a central floating column, and a plurality of resilient pads surrounding said column and vulcanized thereto.

11. In a friction absorbing device comprising end follower elements and side wedge elements having frictional engagement with each other, a composite resilient member compressed between said elements urging them into tight engagement and comprising resilient means, and a rigid member substantially enclosed in said resilient means.

12. In a friction absorbing device comprising end follower elements and side wedge elements having frictional engagement with each other, and a composite resilient member compressed between said elements urging them into tight engagement and comprising a rigid member, and resilient pads surrounding said rigid member.

13. In a friction absorbing device comprising end follower elements and side wedge elements having frictional engagement with each other, and a composite resilient member compressed between said elements urging them into tight engagement and comprising a rigid column, and resilient pads surrounding and secured thereto.

14. In a friction absorbing device comprising end follower elements and side wedge elements having frictional engagement with each other, and a built-up resilient member compressed between said elements urging them into tight engagement and comprising a rigid column, and resilient material therearound and vulcanized thereto.

15. In a friction absorbing device, end followers having outwardly flaring housings with internal friction surfaces, arcuate shoes having tapering faces engaging said surfaces, and a built-up resilient member compressed between said shoes and said followers and comprising a floating member, and a plurality of resilient pads secured thereto.

16. In a friction absorbing device, opposed end followers having cylindrical housings presenting outwardly flaring internal friction surfaces, arcuate friction shoes having tapering faces engaging said surfaces, a resilient pad between said shoes, a rigid member extending therethrough, and resilient pads between said member and said followers.

17. In a friction absorbing device, sets of interlocked frictional elements, a composite resilient member comprising a column spaced from said elements, resilient pads compressed between said column and said elements, and interengaging means on said elements and said pads for positioning said member.

18. In a friction absorbing device, end followers having outwardly flaring housings with internal friction surfaces, arcuate shoes having tapering faces engaging said surfaces, a built-up resilient member compressed between said shoes and said followers, and engaging means on said shoes and followers to retain said device in assembly.

19. In a friction absorbing device, end followers having outwardly flaring housings with internal friction surfaces, arcuate shoes having tapering faces engaging said surfaces, a composite resilient member including a rigid element and having abutment with said shoes and said followers, and interlocking means on said shoes and followers.

20. In a friction absorbing device, sets of interlocked frictional elements, and a composite resilient member comprising a floating column and resilient pads compressed between and abutting said column and said sets of elements.

21. In a friction absorbing device, sets of interlocked frictional elements, a composite resilient member including a rigid column and compressed between and abutting said elements, and interengaging means on said composite member and said frictional elements to position said composite member therebetween.

22. A composite resilient member for a friction absorbing device comprising a rigid element with annular flanges at opposite ends, resilient members secured to said ends and acting as release means for said device, and resilient means encircling and abutting said rigid element intermediate its ends and serving to increase frictional absorption.

23. A composite resilient member for a friction absorbing device comprising a rigid column, resilient pads secured to opposite ends of said column and serving as release means for said device, and resilient means secured to said column intermediate its ends.

24. A composite resilient member for a friction absorbing device comprising a rigid column, resilient means positioned on opposite ends of said column, and other resilient means encircling and secured to said column intermediate its ends, certain of said resilient means acting to increase friction absorption of said device.

25. In a friction device, end followers presenting internal friction surfaces, a plurality of friction elements engaging said surfaces, a rigid member, a plurality of resilient pads interposed between said rigid member and said followers and friction elements, and interlocking means on said followers and said elements.

26. In a friction device, end followers presenting internal friction surfaces, a plurality of friction elements engaging said surfaces, a rigid member, and a plurality of resilient pads abutting said rigid member, said followers, and said friction elements.

27. In a friction device, a built-up resilient member comprising a column having resilient pads secured thereto, and sets of friction elements positioned around said resilient member in engagement therewith, certain of said sets extending between another set for frictional and interlocking engagement therewith.

28. In a friction device, sets of follower wedge elements and side wedge elements having interlocking and frictional engagement, and a composite resilient member abutting each of said elements, said member including a plurality of resilient pads and a rigid member substantially enclosed by said pads.

29. In a friction device, sets of follower wedge elements and side wedge elements having interlocking and frictional engagement, and a composite resilient member abutting said elements, said member including a plurality of resilient pads and a rigid member substantially enclosed by said pads, certain of said pads serving as release means for said device.

30. In a friction device, sets of follower wedge elements and side wedge elements having interlocking and frictional engagement, a composite resilient member abutting said elements and including a plurality of resilient pads, and a rigid member substantially enclosed by said pads, certain of said pads urging said side wedge elements into tight engagement with said follower wedge elements.

DAVID M. LIGHT.